US012789855B2

(12) United States Patent
Kim

(10) Patent No.: US 12,789,855 B2
(45) Date of Patent: Nov. 10, 2026

(54) VEHICLE MOBILITY CONNECTION SYSTEM AND METHOD FOR PROVIDING MOBILITY SERVICE USING THE SAME

(71) Applicant: HYUNDAI MOBIS CO., LTD., Seoul (KR)

(72) Inventor: Seung Jae Kim, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/219,392

(22) Filed: May 27, 2025

(65) Prior Publication Data

US 2026/0015014 A1 Jan. 15, 2026

(30) Foreign Application Priority Data

Jul. 12, 2024 (KR) ........................ 10-2024-0092620

(51) Int. Cl.

| | |
|---|---|
| ***G08G 1/00*** | (2006.01) |
| ***B60W 30/165*** | (2020.01) |
| ***B60W 60/00*** | (2020.01) |
| ***G06V 20/58*** | (2022.01) |
| ***G06V 20/62*** | (2022.01) |

(52) U.S. Cl.

CPC ...... *B60W 60/0025* (2020.02); *B60W 30/165* (2013.01); *G06V 20/58* (2022.01); *G06V 20/625* (2022.01); *G08G 1/22* (2013.01); *B60W 2420/403* (2013.01); *B60W 2554/80* (2020.02); *B60W 2556/50* (2020.02); *B60W 2556/65* (2020.02)

(58) Field of Classification Search

CPC ........... B60W 60/0025; B60W 30/165; B60W 2420/403; B60W 2554/80; B60W 2556/50; B60W 2556/65; G06V 20/58; G06V 20/625; G08G 1/22; G06Q 50/40; G06Q 10/0835; A62C 27/00; A62C 37/38; A62C 99/009

See application file for complete search history.

(56) References Cited

U.S. PATENT DOCUMENTS

| | | | | |
|---|---|---|---|---|
| 2017/0122757 | A1* | 5/2017 | Rajab | G01C 21/3438 |
| 2018/0120837 | A1* | 5/2018 | Regmi | A61B 5/01 |
| 2018/0174093 | A1* | 6/2018 | Perez | G06Q 10/083 |
| 2019/0051015 | A1* | 2/2019 | Gonzalez Aguirre | G06T 7/33 |
| 2021/0173411 | A1* | 6/2021 | Rao | B60L 58/13 |
| 2022/0227231 | A1* | 7/2022 | Husain | B60L 15/2045 |
| 2022/0364866 | A1* | 11/2022 | Williams | B64C 39/024 |
| 2023/0001956 | A1* | 1/2023 | Langenfeld | B60P 1/6436 |
| 2024/0321110 | A1* | 9/2024 | O'Donnell | G08G 1/22 |
| 2024/0343508 | A1* | 10/2024 | Fosgard | B65G 67/24 |

* cited by examiner

*Primary Examiner* — Daniel M. Robert
(74) *Attorney, Agent, or Firm* — NovoTechIP International PLLC

(57) ABSTRACT

Disclosed is a vehicle mobility connection system including a base vehicle that requests a mobility service, and at least one mobility vehicle corresponding to the service requested by the base vehicle, wherein the base vehicle transmits current location information of the base vehicle, wherein the mobility vehicle moves to a current location of the base vehicle based on the current location information, identifies a license plate of the base vehicle that requested the service via a camera when approaching the base vehicle within a preset distance, follows the base vehicle and performs platooning when the base vehicle confirms the requested service, and provides the requested service after the base vehicle stops.

10 Claims, 8 Drawing Sheets

VEHICLE MOBILITY CONNECTION SYSTEM AND METHOD FOR PROVIDING MOBILITY SERVICE USING THE SAME

CROSS-REFERENCE TO RELATED APPLICATIONS

Pursuant to 35 U.S.C. § 119(a), this application claims the benefit of earlier filing dates and right of priority to Korean Application No. 10-2024-0092620, filed on Jul. 12, 2024, the contents of which are hereby incorporated by reference herein in their entirety.

TECHNICAL FIELD

The present embodiments relate to a vehicle equipped with an autonomous driving function, and more particularly to a vehicle mobility connection system that provides a service as a vehicle and a mobility are coupled to each other.

BACKGROUND

Recently, technological development for an autonomous vehicle that travels by itself to a destination without intervention of a driver has been underway, and various services using the autonomous vehicle are gaining attention as one of future industries.

In one example, a bus and a taxi are mainly used for a transportation service using the vehicle at present. Because the bus moves along a specified route, convenience is low in that a passenger's destination and a bus's stop location may be different from each other.

On the other hand, the taxi has an advantage of allowing the passenger to decide both a boarding location and the destination, but because the driver has to drive the vehicle directly to the location desired by the passenger, a labor cost is added to a use of the transportation service, and thus a service usage cost is high.

Accordingly, attempts are being made to apply the autonomous vehicle to the transportation service to allow the passenger to freely set the boarding location and the destination and reduce the labor cost in the service usage cost.

In the transportation service using the autonomous vehicle according to existing technology, a user requests the transportation service via a service terminal. However, a quality of a transportation method in response to the request has a problem related to supply that matches a frequency, a time, and a demand in that the requested service is not able to be provided because of the vehicle being full and excessive delays at night or during peak hours, for example.

SUMMARY

To solve the problems described above, an embodiment of the present disclosure is to provide a vehicle mobility connection system in which a service-providing mobility, called as needed from a vehicle, follows the vehicle or is coupled with another mobility to provide various services.

The problem to be solved by the present disclosure is not limited to the above, and other problems not mentioned will be clearly understood by those skilled in the art to which the present disclosure belongs from the description below.

A vehicle mobility connection system according to one of embodiments of the present disclosure to solve the above-described problems includes a base vehicle that requests a mobility service, and at least one mobility vehicle corresponding to the service requested by the base vehicle, the base vehicle transmit currents location information of the base vehicle, and the mobility vehicle moves to a current location of the base vehicle based on the current location information, identifies a license plate of the base vehicle that requested the service via a camera when approaching the base vehicle within a preset distance, follows the base vehicle and performs platooning when the base vehicle confirms the requested service, and provides the requested service after the base vehicle stops.

According to an embodiment, the mobility service may include an item transportation service between the base vehicle and the mobility vehicle, and a fire suppression service via coupling of the at least one mobility vehicle.

According to an embodiment, when the base vehicle requests the item transportation service, the base vehicle may transmit location information of an item to be picked up to the mobility vehicle, and the mobility vehicle may move to a pick-up location based on the location information of the item to be picked up, identify the item to be picked up via the camera, load the identified item, and move to the current location of the base vehicle.

According to an embodiment, the base vehicle may transmit fire information and location information to the mobility vehicle when requesting the fire suppression service, and the mobility vehicle may move to a fire scene based on the fire information, and deploy a plurality of fire suppression mobilities in a water reservoir form based on an intensity and a range of fire.

According to an embodiment, each fire suppression mobility may include a waterproof member having a changeable length and connected to a further fire suppression mobility, and each fire suppression mobility may adjust a distance to the further fire suppression mobility by controlling the length of the waterproof member based on the intensity and the range of the fire.

According to one of the embodiments of the present disclosure, the service is expanded via the coupling of the vehicle and the various mobilities based on the autonomous driving.

In addition, when the fire occurs in the vehicle, the fire may be effectively suppressed via the coupling of the mobilities.

Effects obtainable from the present disclosure are not limited to the effects mentioned above, and other effects not mentioned will be clearly understood by those skilled in the art from the description below.

DETAILED DESCRIPTION

Figure 1:
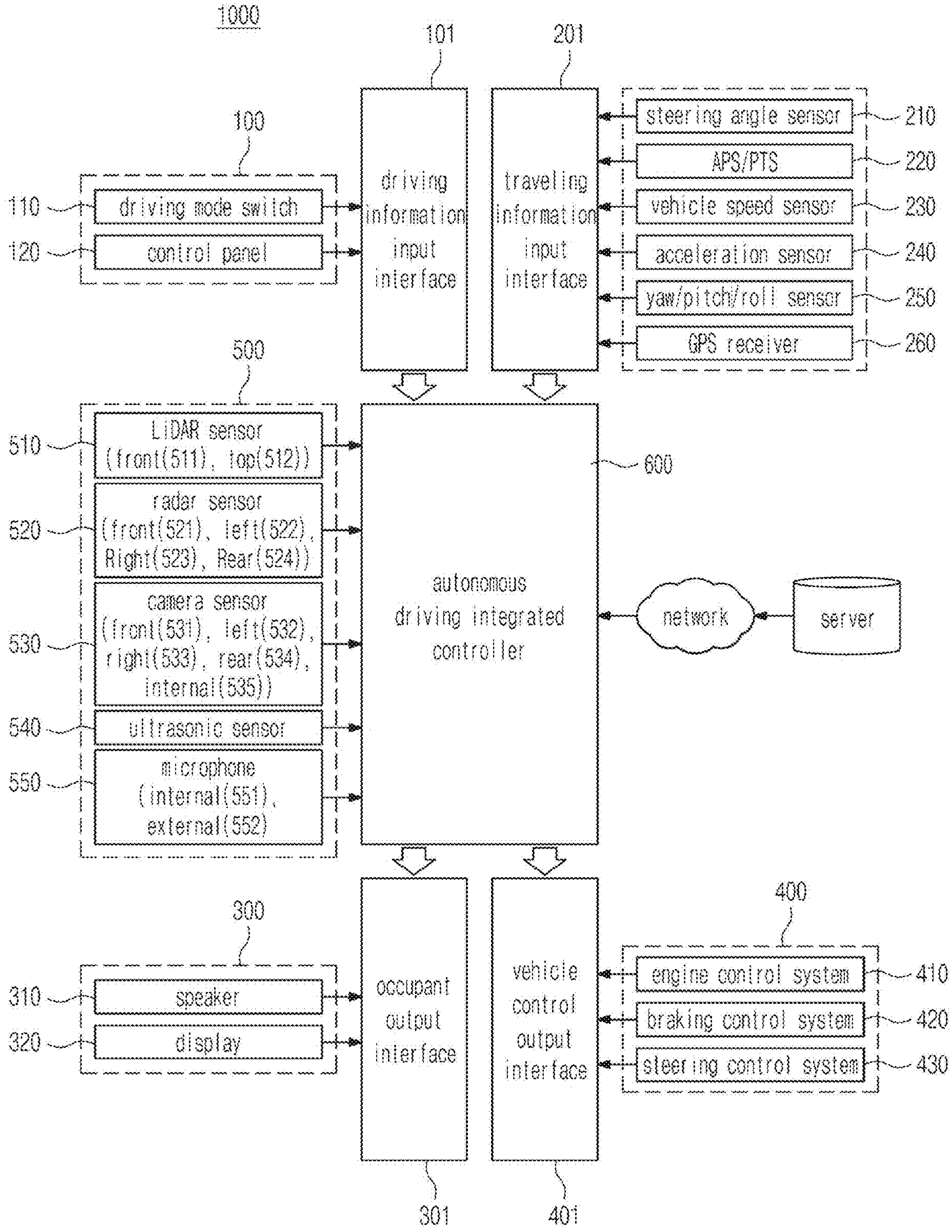
FIG. 1 is an overall block diagram of an autonomous driving control system to which an autonomous driving device according to one of embodiments of the present disclosure may be applied.

Hereinafter, with reference to the attached drawings, an embodiment of the present disclosure will be described in detail such that those skilled in the art to which the present disclosure pertains may easily practice the same. However, the present disclosure may be implemented in various different forms and may not be limited to the embodiment described herein. In addition, to clearly illustrate the present disclosure in the drawings, parts that are not related to the description are omitted, and reference numerals are assigned to similar parts throughout the present document.

Throughout the present document, when a part is described as "including" a certain component, it may mean that other components may be further included without being excluded unless otherwise specifically stated.

Figure 2:
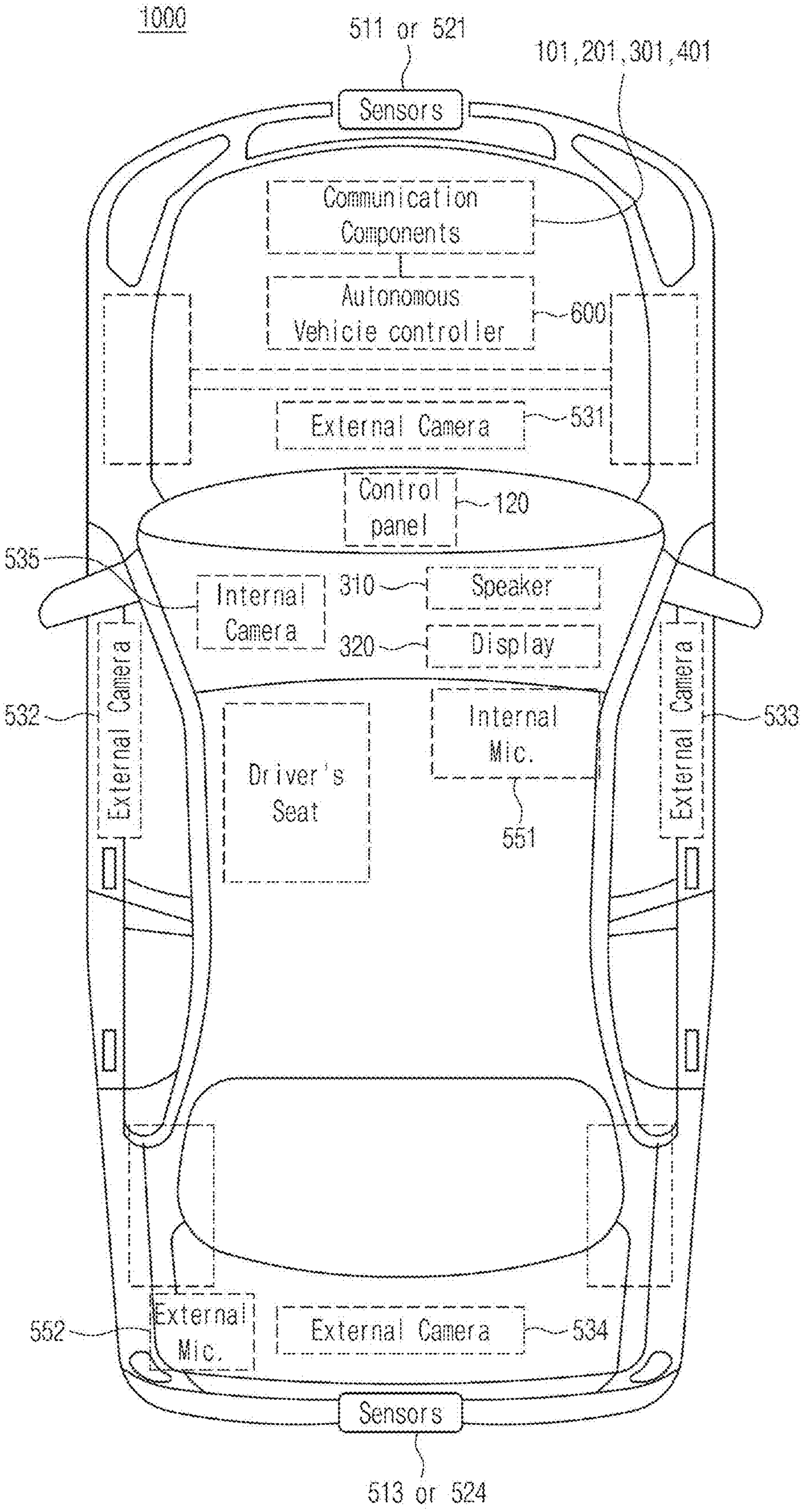
FIG. 2 is an exemplary view showing an example of an autonomous driving device according to one of embodiments of the present disclosure being applied to an autonomous vehicle.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

Figure 3:
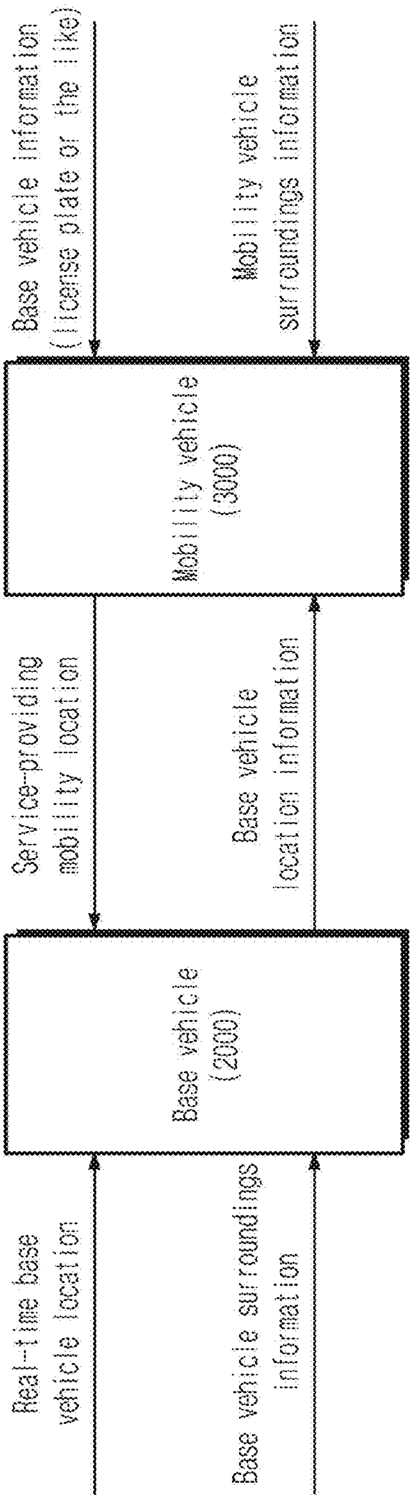
FIG. 3 is a view for illustrating a vehicle mobility connection system according to a first embodiment of the present disclosure.

FIG. 3 is a view for illustrating a vehicle mobility connection system according to a first embodiment of the present disclosure.

Referring to FIG. 3, the vehicle mobility connection system may include a base vehicle 2000 and a mobility vehicle 3000.

The base vehicle 2000 may be a vehicle boarded by a general driver (a user). The base vehicle 2000 may request a mobility service via the driver. The base vehicle 2000 may have a structure that may be coupled with the corresponding mobility vehicle 3000 when requesting the mobility service. The base vehicle 2000 may be a vehicle that may receive the service by calling two or more mobility vehicles 3000.

The base vehicle 2000 may collect a location of the mobility vehicle 3000 that provides the service, a real-time location of the base vehicle 2000, and surroundings information of the base vehicle 2000.

The mobility vehicle 3000 may be a fully autonomous mobility vehicle. The mobility vehicle 3000 may provide at least one mobility service corresponding to the service requested by the base vehicle 2000. A size of the mobility vehicle 3000 may vary depending on a service/function provided, but basically, may be 50 to 100% of a size of the base vehicle 2000, and each mobility vehicle 3000 may be a vehicle providing an own function thereof.

For example, the service between the base vehicle 2000 and the mobility vehicle 3000 may include an item transportation service in which an item is placed at a specific place and the mobility vehicle 3000 picks the item up and moves the same to the location of the base vehicle 2000.

For example, the service between the base vehicle 2000 and the mobility vehicle 3000 may include a service in which the small mobility vehicle 3000 with each function follows the base vehicle 2000 when called upon by a need and provides the function. The mobility vehicle 3000 may provide functions such as an air dresser and an auxiliary battery.

The mobility vehicle 3000 may collect the location of the base vehicle 2000, base vehicle information, and surroundings information of the mobility vehicle.

The mobility vehicle 3000 may assign a mobility vehicle 3000 that is close to the base vehicle 2000 based on the location information received from the base vehicle 2000.

The mobility vehicle 3000 may follow the base vehicle 2000 while maintaining a specific distance.

The mobility vehicle 3000 may be equipped with various sensors as the autonomous vehicle, and may perform close-following travel by identifying the information on the base vehicle 2000 that requested the service via a camera.

For example, the mobility vehicle 3000 may be assigned via communication with a hub where the mobility vehicle that is close to the base vehicle is parked as the base vehicle 2000 transmits the current location thereof and requested service information.

Thereafter, the assigned mobility vehicle 3000 may receive the location of the base vehicle 2000 transmitted in real time and move via the autonomous driving.

When approaching the base vehicle 2000, the mobility vehicle 3000 may use a camera sensor applied externally to identify a license plate of the base vehicle that made the call.

For example, when the base vehicle 2000 calls the two or more mobility vehicles 3000 to receive a plurality of services, a mobility vehicle 3000 that arrives at the base vehicle 2000 first may display vehicle license plate information on a display at a rear side thereof, so that a following mobility vehicle may then match the transmitted vehicle information with the base vehicle license plate information via an external camera for identification.

When receiving a final acceptance of the service from the base vehicle 2000, the mobility vehicle 3000 may proceed with platooning with the base vehicle 2000. In this regard, the platooning may be the mobility vehicle 3000 following the base vehicle 2000.

The mobility vehicle 3000 may provide the service to the base vehicle 2000 after being stopped as the travel is completed.

Specifically, the base vehicle 2000 may request the item transportation service.

The driver in the base vehicle 2000 may select the mobility service while traveling and call the mobility vehicle 3000. To this end, the driver of the base vehicle 2000 may select a service to pick up the left item using an in-vehicle display or a smartphone.

The base vehicle 2000 may transmit location information of an item's pick-up zone to a nearby mobility hub. For example, the pick-up zone may be an area where the mobility vehicle 3000 may automatically pick up a box containing the item and load the box using a robot arm or the like. In this regard, when the item is located in the pick-up zone, the corresponding service may be used.

The mobility vehicle 3000 selected by the mobility hub may receive location information of the item to be picked up. The mobility vehicle 3000 may move to a pick-up location based on the location information of the item to be picked up.

The mobility vehicle 3000 may identify the box containing the item to be picked up located in the pick-up zone with the external camera and then load the box. For example, the identification via the camera sensor may include at least one of QR and barcode.

When transmitting loading information to the base vehicle 2000 after loading the identified item, the mobility vehicle 3000 may receive the current location of the base vehicle 2000 from the base vehicle 2000. For example, when being in a picked-up state, the mobility vehicle 3000 may receive the location information of the base vehicle 2000 in real time.

When receiving the location information of the vehicle 2000, the mobility vehicle 3000 may move to the current location of the base vehicle 2000.

When approaching the base vehicle 2000 to be within a preset range corresponding to the real-time location of the base vehicle 2000, the mobility vehicle 3000 may activate the camera. Thereafter, the mobility vehicle 3000 may use the camera to identify the vehicle information (the license plate) and transmit a final confirmation request to the base vehicle 2000.

The base vehicle 2000 may receive the confirmation request from the mobility vehicle 3000 and finally confirm the service.

Thereafter, the mobility vehicle 3000 may move to a destination via the platooning together with the base vehicle 2000, then provide the service, and then move to a nearby mobility hub.

In one example, when the base vehicle 2000 does not accept the service, the mobility vehicle 3000 may move to the nearby hub again and return the picked-up item to a pick-up zone. Thereafter, the mobility vehicle 3000 may transmit a location of the pick-up zone to the base vehicle 2000.

Figure 4:
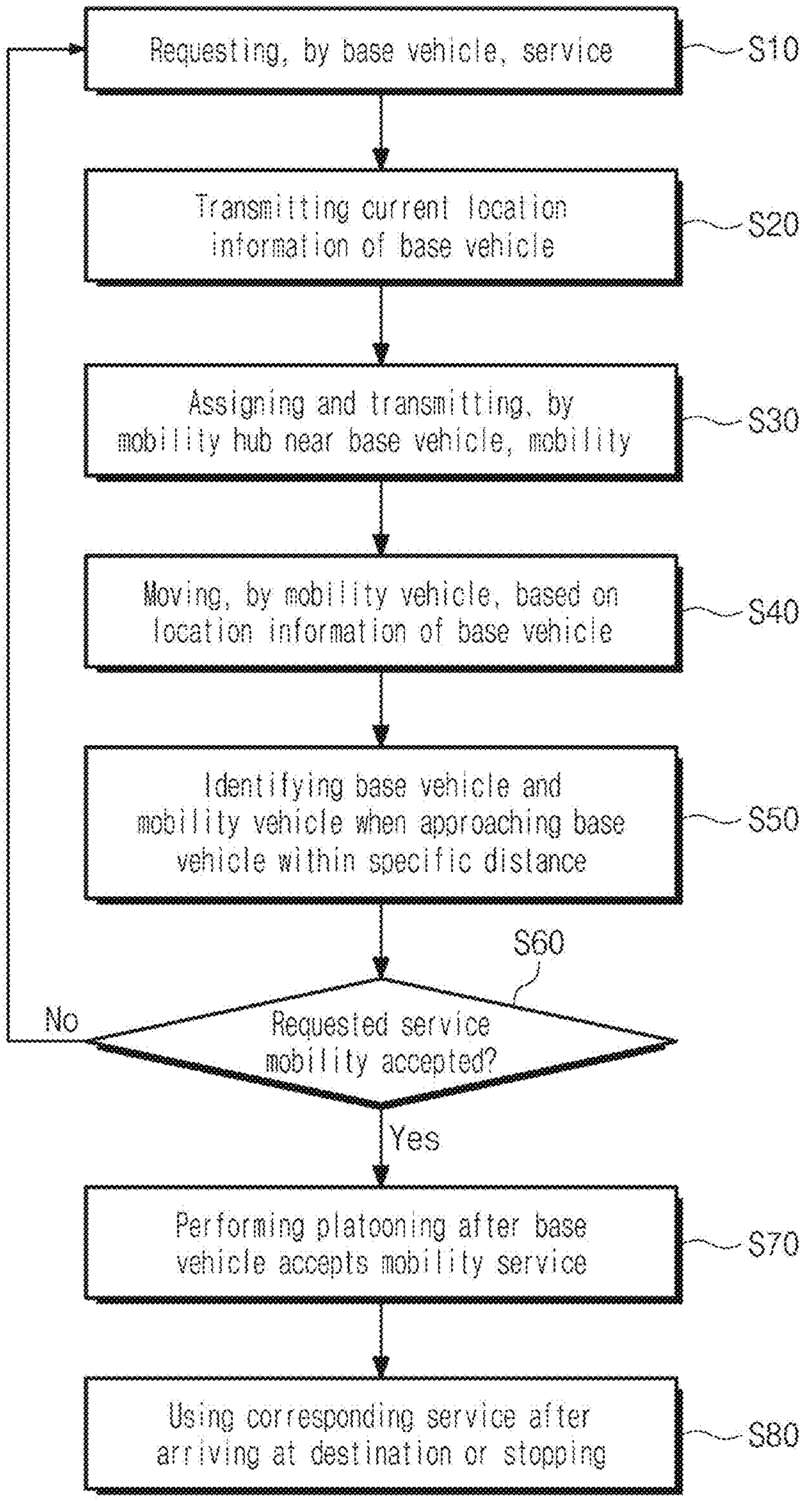
FIG. 4 is a flowchart for illustrating a method for providing a mobility service between a base vehicle and a mobility vehicle according to a first embodiment of the present disclosure.

FIG. 4 is a flowchart for illustrating a method for providing a mobility service between a base vehicle and a mobility vehicle according to a first embodiment of the present disclosure.

Referring to FIG. 4, the base vehicle 2000 may make a request for the service to the mobility vehicle 3000 (S10).

The base vehicle 2000 may transmit the current location information thereof to the outside (S20).

The mobility hub near the base vehicle 2000 may assign the mobility vehicle 3000 corresponding to the requested service and transmit the location information of the base vehicle 2000 to the mobility vehicle 3000 (S30).

The mobility vehicle 3000 may move to the current location of the base vehicle 2000 based on the received current location information (S40).

When approaching the base vehicle 2000 to be within a specific distance, the mobility vehicle 3000 may identify the base vehicle 2000 (S50). For example, when approaching the base vehicle 2000 to be within the preset distance, the mobility vehicle 3000 may identify the license plate of the base vehicle 2000 that requested the service via the camera.

The base vehicle 2000 may identify the mobility vehicle 3000 corresponding to the requested service (S60).

When the base vehicle 2000 identifies the mobility vehicle 3000 and accepts the requested service, the mobility vehicle 3000 may follow the base vehicle 2000 and perform the platooning (S70).

After the base vehicle 2000 and the mobility vehicle 3000 perform the platooning and arrive at the destination or stop, the mobility vehicle 3000 may provide the requested service (S80).

In one example, after step S60, when the base vehicle 2000 rejects the service of the mobility vehicle 3000, step S10 may be performed again.

Figure 5:
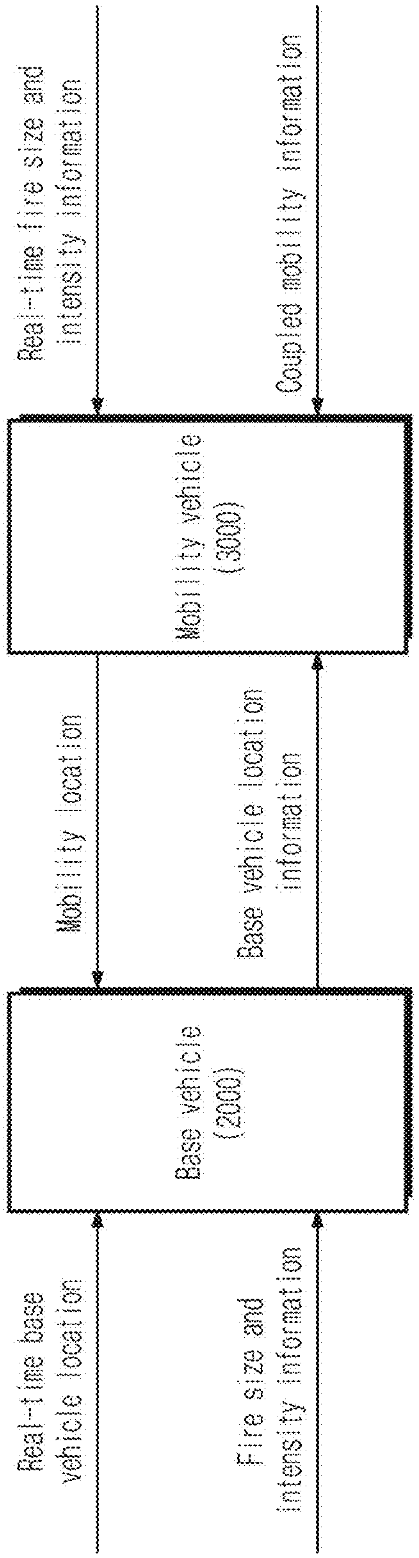
FIG. 5 is a view for illustrating a vehicle mobility connection system according to a second embodiment of the present disclosure.
Figure 6:
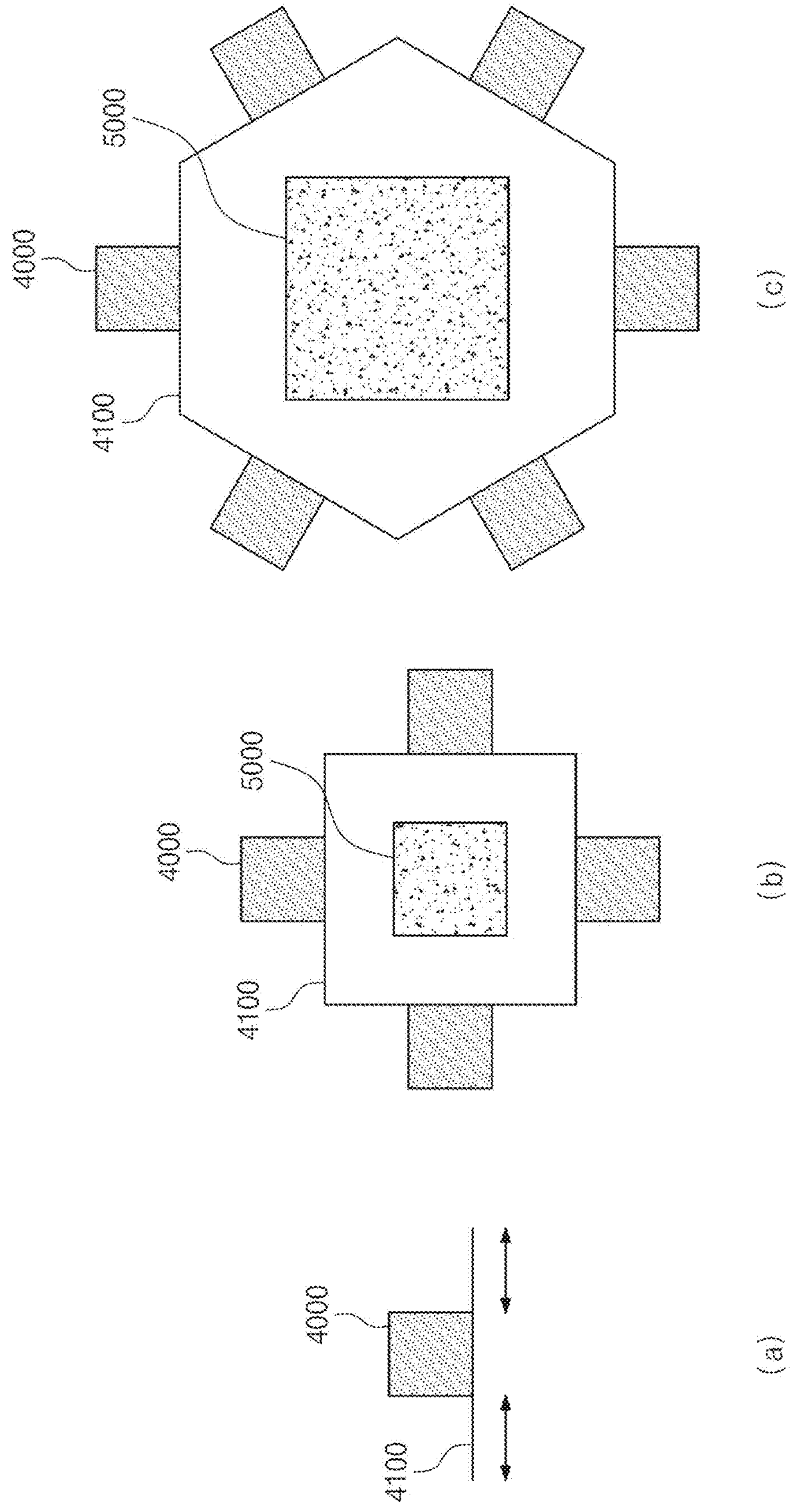
FIGS. 6 and 7 are views for illustrating a fire suppression method of a vehicle mobility connection system according to a second embodiment of the present disclosure.
Figure 7:
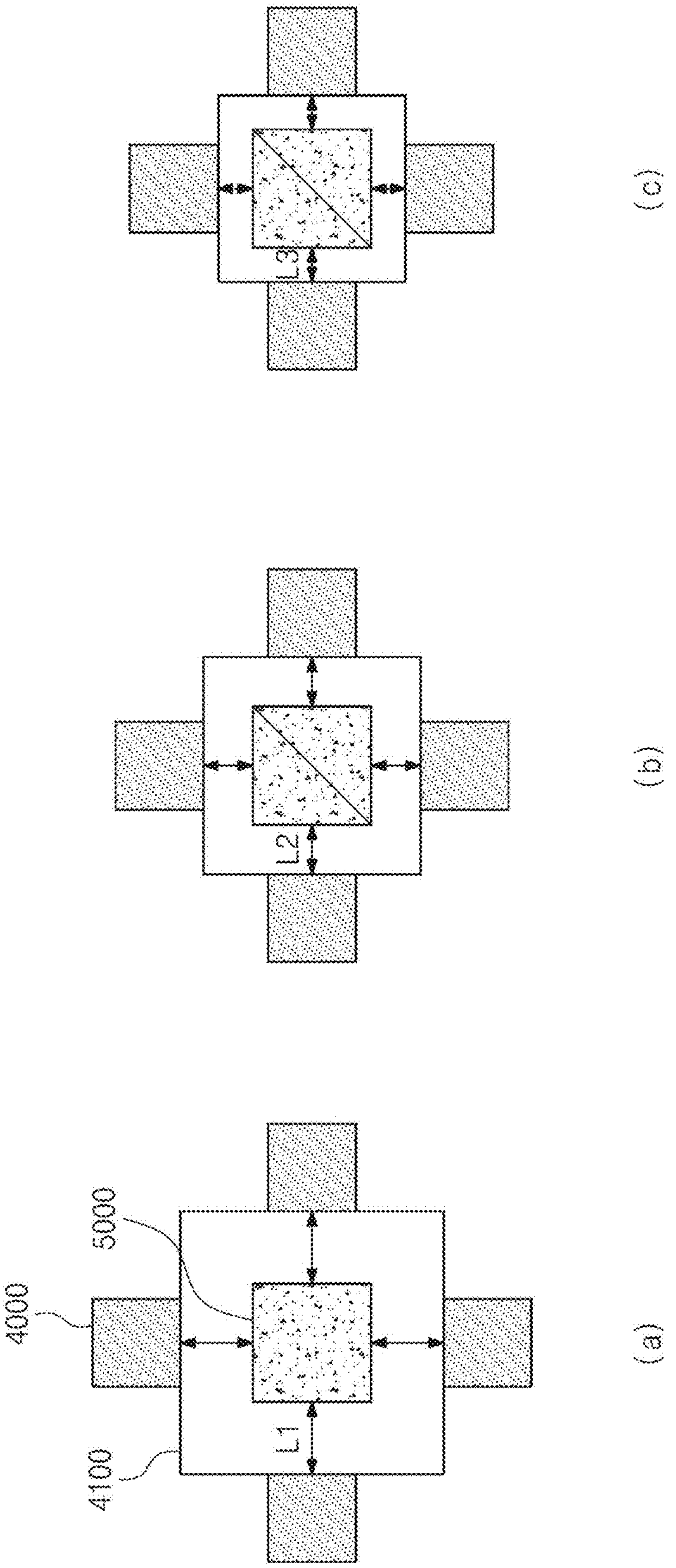

FIG. 5 is a view for illustrating a vehicle mobility connection system according to a second embodiment of the present disclosure. FIGS. 6 and 7 are views for illustrating a fire suppression method of a vehicle mobility connection system according to a second embodiment of the present disclosure.

Referring to FIG. 5, the vehicle mobility connection system may include the base vehicle 2000 and the mobility vehicle 3000. The vehicle mobility connection system according to the second embodiment may perform fire suppression using a fire suppression mobility included in the mobility vehicle 3000.

The base vehicle 2000 may be the vehicle that is boarded by the general driver (the user), has the structure that may be coupled with the corresponding mobility when requesting the mobility service, and is able to receive the service by calling the two or more mobilities.

The base vehicle 2000 may collect the location of the mobility vehicle 3000 providing the service, the real-time location of the base vehicle 2000, and fire scale and intensity information.

The mobility vehicle 3000 may be the fully autonomous mobility vehicle. The size of the mobility vehicle 3000 may vary depending on the service/function provided, but basically, may be 50 to 100% of the size of the base vehicle 2000, and each mobility vehicle 3000 may be the vehicle providing the own function thereof.

For example, the service between the base vehicle 2000 and the mobility vehicle 3000 may include a mobility service in which the small mobility vehicle 3000 with each function follows the base vehicle 2000 when called upon by the need and provides the function.

In this regard, the mobility service may include a fire suppression service via coupling of at least one mobility vehicle 3000.

The mobility vehicle 3000 may collect the location of the base vehicle 2000, coupled mobility information, and the real-time fire scale and intensity information.

The mobility vehicle 3000 may assign the mobility vehicle 3000 that is close to the base vehicle 2000 based on the location information received from the base vehicle 2000.

The mobility vehicle 3000 may follow the base vehicle 2000 while maintaining the specific distance.

The mobility vehicle 3000 may be equipped with the various sensors as the autonomous vehicle, and may perform the close-following travel by identifying the information on the base vehicle 2000 that requested the service via the camera.

For example, the mobility vehicle 3000 may be assigned via the communication with the hub where the mobility vehicle that is close to the base vehicle is parked as the base vehicle 2000 transmits the current location thereof and the requested service information.

Thereafter, the assigned mobility vehicle 3000 may receive the location of the base vehicle 2000 transmitted in real time and move via the autonomous driving.

When approaching the base vehicle 2000, the mobility vehicle 3000 may use the camera sensor applied externally to identify the license plate of the base vehicle that made the call.

For example, when the base vehicle 2000 calls the two or more mobility vehicles 3000 to receive the plurality of services, the mobility vehicle 3000 that arrives at the base vehicle 2000 first may display the vehicle license plate information on the display at the rear side thereof, so that the following mobility vehicle may then match the transmitted vehicle information with the base vehicle license plate information via the external camera for the identification.

When identifying the base vehicle 2000, the mobility vehicle 3000 may proceed with the platooning via the final acceptance. In this regard, the platooning may be the mobility vehicle 3000 following the base vehicle 2000.

The mobility vehicle 3000 may provide the service to the base vehicle 2000 after being stopped as the travel is completed.

Hereinafter, the fire suppression service based on the coupling of the mobilities will be described in detail with reference to FIGS. 6 and 7.

When a fire caused by a battery occurs while the base vehicle 2000 is traveling, the base vehicle 2000 may transmit the current location information and the vehicle information of the base vehicle 2000 to the nearby mobility hub.

The base vehicle 2000 may collect fire information via surrounding infrastructure information (CCTV) to finally determine the number of fire suppression mobilities 4000 to transmit.

The fire suppression mobilities 4000 may be arranged in a form of a water reservoir to extinguish the fire by containing water (or a fire suppression material) centered on a fire-affected vehicle 5000 based on a fire scale. In this regard, the fire-affected vehicle 5000 may indicate a case in which the fire occurs in the base vehicle 2000.

For example, the fire suppression mobility 4000 may be a mobility vehicle prepared mainly for an electric vehicle battery fire. The fire suppression mobility 4000 may include a tank structure that may contain water (or the fire suppression material) therein.

Referring to (a) in FIG. 6, the fire suppression mobility 4000 has a waterproof member 4100 that may change a length thereof when suppressing the fire and may be connected to another fire suppression mobility, to create a structure that suppresses the fire by pouring water (or a fire extinguishing agent) in the water reservoir form. The length of the waterproof member 4100 may be changeable.

Referring to (b) and (c) in FIG. 6, the number of fire suppression mobilities 4000 arranged may vary based on the scale and a shape of the fire.

As shown in (b) in FIG. 6, when the fire scale is small, four fire suppression mobilities 4000 may be used, and a square water reservoir form may be formed via the waterproof member 4100 of each fire suppression mobility 4000.

As shown in (c) in FIG. 6, when the fire scale is great, six fire suppression mobilities 4000 may be used, and a hexagonal water reservoir form may be formed via the waterproof member 4100 of each fire suppression mobility 4000.

In addition, referring to (a) to (c) in FIG. 7, when sensing, via an external camera or temperature sensor, that an intensity of the fire is gradually decreasing, the fire suppression mobility 4000 gradually reduces the length of the waterproof member such that a distance from the fire is gradually reduced and concentrated fire extinguishing is performed. In addition, a distance between the fire suppression mobilities 4000 may be reduced and a level of water (the fire suppression material) may be increased such that the concentrated fire extinguishing is performed. On the other hand, when the intensity of the fire is increased or a range of the fire is widened, the arrangement of the fire suppression mobilities 4000 may be adjusted to an appropriate range.

As shown in (a) in FIG. 7, when the intensity of the fire is maximum, the waterproof members 4100 of the four fire suppression mobilities 4000 may be spread to a maximum range L1 to form the square water reservoir.

As shown in (b) in FIG. 7, when the intensity of the fire is reduced, the waterproof members 4100 of the four fire suppression mobilities 4000 may be spread to an intermediate range L2 smaller than the maximum range L1 to form the square water reservoir.

As shown in (c) in FIG. 7, when the intensity of the fire is minimum, the waterproof members 4100 of the four fire suppression mobilities 4000 may be spread to a minimum range L3 smaller than the intermediate range L2 to form the square water reservoir.

Figure 8:
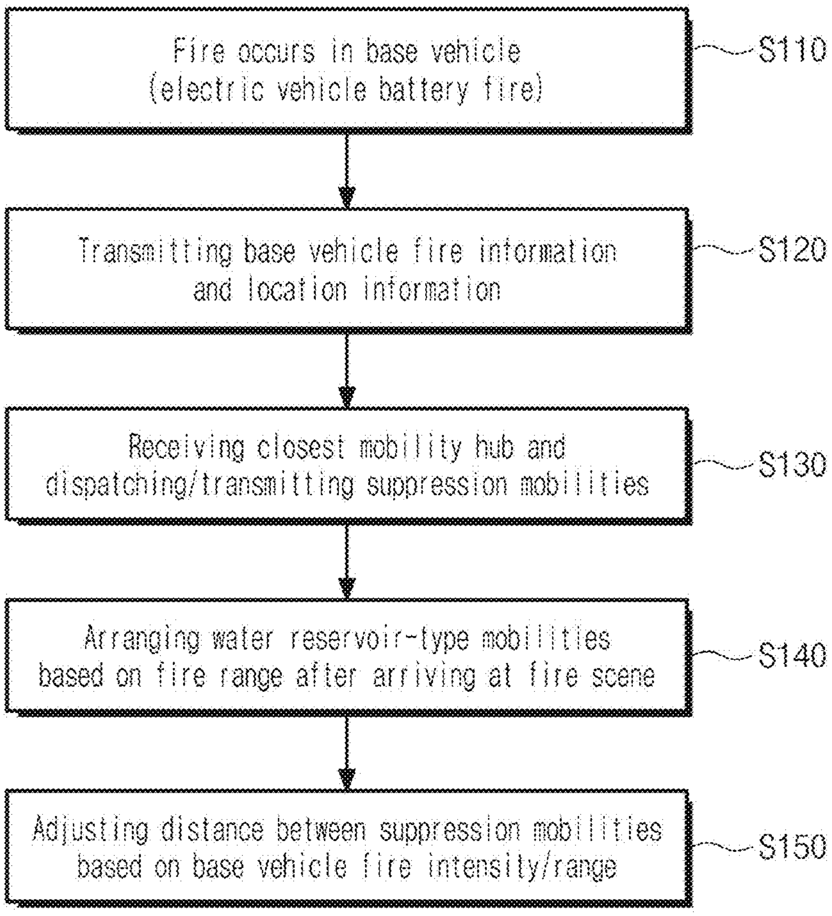
FIG. 8 is a flowchart for illustrating a method for providing a mobility service between mobility vehicles according to a second embodiment of the present disclosure.

FIG. 8 is a flowchart for illustrating a method for providing a mobility service between mobility vehicles according to a second embodiment of the present disclosure.

Referring to FIG. 8, when the fire occurs in the base vehicle 2000 (S110), the fire information and the location information may be transmitted to the mobility hub (S120). For example, the base vehicle 2000 may be an electric vehicle.

At least one of the mobility vehicle 3000 and the fire suppression mobility 4000 may be deployed or dispatched from the closest mobility hub based on the fire location information, and the base vehicle fire information and the location information may be transmitted to the dispatched fire suppression mobility 4000 (S130). For example, the fire suppression mobility 4000 may move by being loaded into the mobility vehicle 3000, or each of the plurality of fire suppression mobilities 4000 may move to the fire scene.

After the fire suppression mobilities 4000 arrive at the fire scene, the plurality of fire suppression mobilities may be arranged in the water reservoir form based on the intensity and the range of the fire (S140). For example, the square water reservoir form may be formed using the waterproof members 4100 of the four fire suppression mobilities 4000 or the hexagonal water reservoir form may be formed using the six fire suppression mobilities 4000.

The distance between the fire suppression mobilities, which adjust the distance therebetween by controlling the length of the waterproof members, may be adjusted based on the intensity and the range of the fire of the fire-affected vehicle 5000 (S150). For example, the waterproof members 4100 of the fire suppression mobilities 4000 may adjust the arrangement within the minimum to maximum range based on the intensity of the fire.

That is, the technical idea of the present disclosure may be applied to an entirety of the autonomous vehicle or only to some components inside the autonomous vehicle. The scope of the rights of the present disclosure should be determined based on the matters set forth in the claims.

As another aspect of the present disclosure, the operation of the above-described proposal or invention may be provided in a form of codes that may be implemented, realized, or executed by a "computer" (a comprehensive concept including a system on chip (SoC), a microprocessor, or the like), an application storing or including the codes, a computer-readable storage medium, a computer program product, or the like, and all of which may also fall within the scope of the present disclosure.

The detailed description of the preferred embodiments of the present disclosure disclosed as described above has been provided to enable those skilled in the art to implement and practice the present disclosure. Although the description has been made with reference to the preferred embodiments of the present disclosure, those skilled in the art will understand that the present disclosure may be variously modified and changed without departing from the scope of the present disclosure. For example, those skilled in the art may utilize the respective configurations described in the above-described embodiments in a manner of combining them to each other.

Accordingly, the present disclosure is not intended to be limited to the embodiments described herein, but is intended to be accorded the widest scope consistent with the principles and novel features disclosed herein.

What is claimed is:

1. A vehicle mobility connection system, comprising:

a base vehicle configured to request a mobility service; and a mobility vehicle corresponding to the mobility service requested by the base vehicle, wherein the base vehicle is configured to transmit current location information of the base vehicle, and wherein the mobility vehicle is configured to:

move to a current location of the base vehicle based on the current location information of the base vehicle;

identify, using a camera, a license plate of the base vehicle that requested the mobility service when the mobility vehicle approaches the base vehicle to be within a preset distance from the base vehicle;

follow the base vehicle and perform platooning when the base vehicle confirms the requested mobility service; and provide the requested mobility service after the base vehicle stops.

2. The vehicle mobility connection system of claim 1, wherein the mobility service includes:

an item transportation service between the base vehicle and the mobility vehicle; and a fire suppression service via coupling of the mobility vehicle.

3. The vehicle mobility connection system of claim 2, wherein:

when the base vehicle requests the item transportation service, the base vehicle is configured to transmit, to the mobility vehicle, location information of an item to be picked up, and the mobility vehicle is configured to:

move to a pick-up location based on the location information of the item to be picked up;

identify, using the camera, the item to be picked up;

load the identified item; and move to the current location of the base vehicle.

4. The vehicle mobility connection system of claim 2, wherein:

the base vehicle is configured to transmit, to the mobility vehicle, fire information and the current location information when requesting the fire suppression service, and the mobility vehicle is configured to:

move to a fire scene based on the fire information; and deploy, based on an intensity and a range of fire, a plurality of fire suppression mobilities in a water reservoir form.

5. The vehicle mobility connection system of claim 4, wherein:

each fire suppression mobility includes a waterproof member having a changeable length and connected to a different fire suppression mobility, and each fire suppression mobility is configured to adjust a distance to the different fire suppression mobility by controlling, based on the intensity and the range of the fire, the changeable length of the waterproof member.

6. A method for providing a mobility service, comprising:

requesting, by a base vehicle, the mobility service;

transmitting current location information of the base vehicle;

moving a mobility vehicle to a current location of the base vehicle based on the current location information of the base vehicle;

identifying, using a camera of the mobility vehicle, a license plate of the base vehicle that requested the mobility service when the mobility vehicle approaches the base vehicle to be within a preset distance from the base vehicle;

following, by the mobility vehicle, the base vehicle and performing platooning when the base vehicle confirms the requested mobility service; and providing, by the mobility vehicle, the requested mobility service after the base vehicle stops.

7. The method of claim 6, wherein the mobility service includes:

an item transportation service between the base vehicle and the mobility vehicle; and a fire suppression service via coupling of at least one mobility vehicle.

8. The method of claim 7, further comprising:

transmitting, from the base vehicle to the mobility vehicle, location information of an item to be picked up when the base vehicle requests the item transportation service;

moving the mobility vehicle to a pick-up location based on the location information of the item to be picked up;

identifying, using the camera of the mobility vehicle, the item to be picked up;

loading, by the mobility vehicle, the identified item; and moving the mobility vehicle to the current location of the base vehicle.

9. The method of claim 7, further comprising:

transmitting, from the base vehicle to the mobility vehicle, fire information and the current location information of the base vehicle when requesting the fire suppression service;

moving the mobility vehicle to a fire scene based on the fire information; and deploying, by the mobility vehicle, a plurality of fire suppression mobilities in a water reservoir form based on an intensity and a range of fire.

10. The method of claim 9, wherein each fire suppression mobility includes a waterproof member having a changeable length and connected to a further fire suppression mobility, wherein deploying the plurality of fire suppression mobilities in the water reservoir form further includes adjusting a distance from each fire suppression mobility to another fire suppression mobility by controlling, based on the intensity and the range of the fire, the changeable length of the waterproof member.

* * * * *